United States Patent [19]

Stephens

[11] 4,044,935
[45] Aug. 30, 1977

[54] AUTOMOTIVE BATTERY CARRIERS

[76] Inventor: Hugh Stephens, 90 Leighton Ave., Winnipeg, Manitoba, Canada

[21] Appl. No.: 670,387

[22] Filed: Apr. 14, 1976

[51] Int. Cl.² .......................................... B65D 71/00
[52] U.S. Cl. .................................. 224/45 F; 429/187
[58] Field of Search ................ 224/45 P, 45 F, 45 C; 220/95 R; 429/187, 122

[56] References Cited

U.S. PATENT DOCUMENTS

| 1,338,465 | 4/1920 | Smith | 429/187 |
| 1,461,995 | 7/1923 | Young | 224/45 F |
| 1,671,812 | 5/1928 | Chase | 224/45 F |
| 1,734,511 | 11/1929 | Allen | 224/45 F |
| 1,753,396 | 4/1930 | Witkowski et al. | 224/45 F |
| 3,956,022 | 5/1976 | Fox | 429/187 |

Primary Examiner—Robert J. Spar
Assistant Examiner—Kenneth Noland

[57] ABSTRACT

A battery lifting and carrying device comprising a rigid handle of dielectric material supporting twin parallel "U" springs inversely positioned and spacedly located within said handle, vertically over two filling wells of said battery, the open ends of said inverted U springs being opposably bent at right angles to said handle to springably enter the filling well and lock under the lower wall of the well when U spring pressure is released.

2 Claims, 2 Drawing Figures

AUTOMOTIVE BATTERY CARRIERS

My invention relates to improvements in automotive battery carriers.

Over the years battery carriers have been modified to meet battery case designs. Original battery cases were provided with lugs vertically moulded on the battery's lateral sides, containing finger holes or openings of half-moon design. Subsequently the lugs were replaced by lateral rims. As this type of battery case became obsolete a newer carrier conveniently referred to as a "strap carrier" was introduced and consisted of two short flat strips of metal separated by a length of flexible dielectric strap material. A circular opening in each of the metal strips being of slightly differing diameter was designed to selectively fit over the battery terminal posts, the positive being slightly larger than the negative. Mainly due to lack of uniformity by various battery manufacturers regarding diameter of posts and partly by induced wear on both posts and the washer-like holes, this design proved ineffective creating a degree of uncertainty and various ancillary devices associated with the metal strips were introduced to provide additional grip on the base of the terminal post. These however have only met with limited success, the gripping element having a tendency to ride up the tapered terminal post. Moreover, where the strap is used the 40–50-lb. battery weight is concentrated with crushing force on the sides of the palm of the hand.

Instant invention, in providing a rigid substantial handle avoids this discomfort and in addition provides a 100 percent positive non-slip battery carrying device. The preferred embodiment of my device has a rigid handle made of plastic or other tubular dielectric material having a horizontally slotted portion at each end into which is received in suspension the looped portion of an elongated inverted U spring, the slot being later blocked, preferably by a telescopic end portion. The parallel legs of the inverted U springs terminate in lugs opposably bent outward at right angles transverse of the battery. By exerting a slight differential side pressure the legs can be offset and thus avoid confrontation with each other when squeezed, permitting the legs to freely enter the battery filling well. Battery filling wells are formed of a short length of rigid tubing integral with the top of the battery case, said rigid tubing having vertical slots at 180° transverse of the battery and when the lugs are pushed down into the well, a procedure lasting a fraction of a second, a clicking sound signals the lugs have locked against a lower ledge of the well. To remove the lugs from the well a slight inward pressure on the lugs of the inverted U spring enables them to be withdrawn. As a fail-safe measure, the length of the lugs should exceed the radius of the filling well, ensuring that under all conditions of U spring compression, both lugs will be locked and remain locked until such time as they are deliberately retracted. Since the filling wells of the 6- and 12-volt automotive batteries are so spaced that the outer wells of the 6-volt match wells 2 and 5 of the 12-volt, the one space setting of the inverted U springs serves both batteries without need to adjust the length of the handle. However the larger 6-volt diesel batteries have a wider well spacing than the automotive type and for them I prefer as a second embodiment, a three-piece telescopic handle to serve both auto and diesel batteries. This telescopic modification may be simply achieved by cutting the rigid handle into two even lengths and inserting the severed ends into an adequate length of snugly oversized tubing of material similar to the original rigid handle. The new telescopic handle may be lengthened at will to match the desired well holes. In order to prevent corrosion of the spring lugs by the battery electrolyte their lower extremity is coated with an acid resisting enamel.

Figure 1:
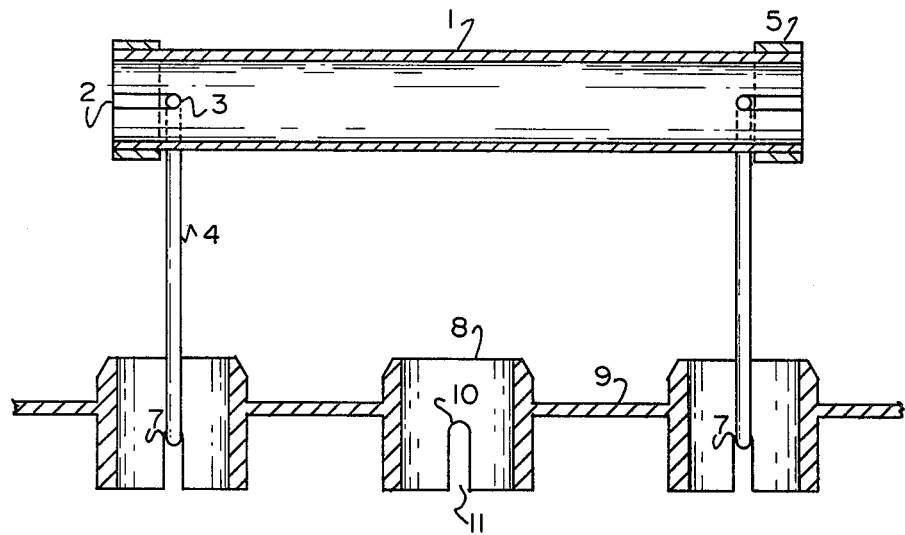
FIG. 1 is a cross-sectional side view of the handle with spring lugs suspended and hooked into a filling well.

In the drawing FIG. 1, handle 1 comprising a length of rigid tubing of plastic or fibre has a slot 2 horizontally penetrating the handle 1 at each end to receive the looped portion 3 of the inverted U springs 4 which enables them to pivot therein at the innermost end of slot 2. A collar 5 surrounds the endwise slotted portions 2 of the handle 1 effectively blocking any lengthwise movement of each inverted U spring 4.

The telescopic modification of the handle 1, being obvious, is not depicted in the drawings.

Figure 2:
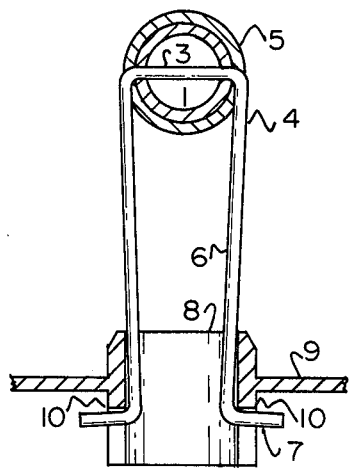
FIG. 2 is a cross-sectional end view of the battery lifter shown in FIG. 1 with lugs projected into the vertical gas escape slot in the filling well. Similar numerals refer to similar points throughout both views.

In the drawing FIG. 2, the caps of the two filling wells 8 having been removed, the lugs 7 of the legs 6 are seen sprung into the filling well gas escape slot 11 having penetrated the well 8 of the battery case 9 to hook on to the ledge 10 of the well slot 11.

In practice the legs 6 of the U spring 4 are squeezed together permitting lugs 7 to enter well hole 8. The pressure is partially released permitting spring pressure to exert itself. The legs 6 are forced downwards into the well until a clicking sound signals that the lugs have reached open space and are now firmly locked on the lower ledge of gas escape slot 10 or the lower rim of the well hole. This action is repeated for the second inverted U spring. The battery may then be lifted and manoeuvered as desired. Having transferred the battery to its new location and ensured it is gravitationally secure the lugs may be withdrawn by squeezing and holding the twin legs of the U spring until they are removed from the well.

I claim:

1. In an automotive battery lifter of the type having a rigid handle of dielectric material having end slots disposed horizontally and which slidably receives two-point suspension means for linking said handle with said battery, the improvement consisting in said handle having telescopic end pieces to block the sliding movement at said points of suspension, and each said suspension means comprising a length of wire squarely bent and subsequently tempered to an inverted U configuration to form a pair of spring legs unitarily pivotal one at each of said points of suspension, the extremity of each said pair of legs having lower free ends enamelled to prevent acid corrosion, and said pair of spring legs each having a pair of lugs, each lug being bent at right angles from each leg, and each lug of said pair of lugs extending away from each other, said lugs to be less in length than the radius of a battery filling well, said spring legs being compressible to permit said lugs to be inserted into the filling well of said battery and when sprung engage the lower wall of the filling well and remain in locked position to facilitate the carrying of the automotive battery.

2. A battery lifter as defined in claim 1, said dielectric handle being of composite tubular construction being severed into two halves each half telescoped into a rigid central piece of slightly larger diameter, said composite unit facilitating an adjustable vertical suspension means for said U-spring legs to accommodate variable filling well spacings of differing commercial automotive batteries.

* * * * *